United States Patent
Jackson

(10) Patent No.: US 7,587,957 B2
(45) Date of Patent: Sep. 15, 2009

(54) MULTIPLE-RATIO DUAL CLUTCH VEHICLE TRANSMISSION

(75) Inventor: Graeme A. Jackson, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 360 days.

(21) Appl. No.: 11/702,359

(22) Filed: Feb. 5, 2007

(65) Prior Publication Data

US 2008/0184846 A1 Aug. 7, 2008

(51) Int. Cl.
*F16H 3/08* (2006.01)
(52) U.S. Cl. .............................. 74/329; 74/330; 74/331
(58) Field of Classification Search ................. 74/329, 74/330, 331
See application file for complete search history.

(56) References Cited

U.S. PATENT DOCUMENTS

| | | | |
|---|---|---|---|
| 2,379,023 A | 6/1945 | Miller | |
| 4,296,644 A | 10/1981 | Sada et al. | |
| 5,613,401 A * | 3/1997 | Maurizio | 74/325 |
| 6,397,994 B1 | 6/2002 | Bowen | |
| 7,469,609 B2 * | 12/2008 | Baldwin | 74/330 |
| 2005/0247147 A1 | 11/2005 | Gumpoltsberger et al. | |
| 2007/0214904 A1 * | 9/2007 | Ohnemus | 74/330 |
| 2008/0245167 A1 * | 10/2008 | Gitt | 74/331 |

FOREIGN PATENT DOCUMENTS

| | | |
|---|---|---|
| DE | 100 37 401 A1 | 2/2002 |
| FR | 1469727 | 2/1967 |
| WO | 2007031193 | 3/2007 |

OTHER PUBLICATIONS

Lifshits et al., Improvement of Continuously Variable Automatic Drives of Automobiles with Preselective Control and Non-separating Gear Change, Vestnik Mashinostroeniya, vol. 69, No. 5, pp. 5-9, 1989 1323 Soviet Engineering Research 9(1989) No. 5, New York.
International Search Report for PCT/IB2008/000241 dated Jun. 25, 2008.

* cited by examiner

*Primary Examiner*—Tisha D Lewis
(74) *Attorney, Agent, or Firm*—Brooks Kushman P.C.

(57) ABSTRACT

The disclosed multiple-ratio power transmission mechanism for a vehicle includes main transmission gearing and countershaft gearing that establish selectively plural power flow paths from an engine to vehicle traction wheels. Ratio change clutches are engageable selectively to establish power flow paths and pre-selected power flow during a ratio shift sequence throughout an extended overall ratio spread without a requirement for additional gearing.

12 Claims, 1 Drawing Sheet

MULTIPLE-RATIO DUAL CLUTCH VEHICLE TRANSMISSION

BACKGROUND OF THE INVENTION

1. Field of the Invention

The invention relates to power transmission gearing including a countershaft with a ratio change clutch for establishing high ratio and low ratio torque delivery paths through countershaft gear elements.

2. Background Art

A power transmission mechanism for road vehicles, both automotive passenger vehicles and heavy-duty trucks and medium-duty trucks, have multiple gear ratios in a range that is sufficiently broad to accommodate torque capacity requirements. An increased overall gear ratio range may be provided by using, with a multiple-ratio transmission mechanism, a range gearing arrangement. The overall number of gear ratios that would be available using range gearing would be equal to the number of gear ratios for the transmission multiplied by the number the number of ratios available in the range gearing arrangement. An example of a dual clutch transmission with range gearing is disclosed in pending application Ser. No. 11/702,361, filed Feb. 5, 2007, entitled "Dual Clutch Transmission with Multiple Range Gearing". That application is assigned to the assignee of the present invention.

Ratio changes in a multiple-ratio transmission may be achieved by selectively engaging and disengaging dual clutch discs in a master clutch assembly that drivably connects a vehicle engine to power input headset gearing for the multiple-ratio transmission. An example of a dual clutch construction capable of being used in transmissions of this type may be seen by referring to co-pending U.S. patent application Ser. No. 10/983,531, filed Nov. 8, 2004, entitled "Dual Clutch Assembly for a Heavy-Duty Automotive Powertrain", now U.S. Pat. No. 7,204,166, issued Apr. 17, 2007. That application also is assigned to the assignee of the present invention. An earlier example of a dual clutch arrangement capable of being used in a countershaft transmission is disclosed in U.S. Pat. No. 6,397,994.

In these examples of dual clutch constructions, separate master clutch discs deliver power to each of two power input shafts, one of which may be concentrically disposed within the other. The clutch discs may be selectively engaged and disengaged hydraulically or mechanically so that as one clutch disc becomes disengaged, the other becomes engaged, and vice-versa. A vehicle engine thus can be selectively connected to each of the two power input shafts during a power shift sequence.

It is known design practice also to increase the number of overall powertrain ratios by providing a gearing arrangement with additional headset gearing rather than a range gearing arrangement that is separate from the transmission gearing. The additional headset gearing, however, together with an added master friction clutch disc that would be required for the additional headset gear, would result in added cost, added weight and complexity to the powertrain.

SUMMARY OF THE INVENTION

According to one aspect of the invention, a multiple-ratio countershaft transmission with a pair of headset gears will provide at least two more gear ratios in addition to the usual number of gear ratios that would be available in a countershaft transmission with the same number of gear pairs in engagement.

One embodiment of the disclosed invention has a pair of headset gears, each of which is connected to a separate power input shaft. The power input shafts, as in the case of powertrains of the type previously described, may be connected to an engine through a dual master clutch arrangement. A countershaft assembly for the multiple-ratio transmission includes a so-called odd countershaft that rotatably supports a first set of countershaft gear elements and a so-called even countershaft rotatably supported for rotation about the axis of the odd countershaft. The even countershaft may be a sleeve surrounding the odd countershaft. The even countershaft has at least two gear elements, each of which engages a separate one of the headset gears. The odd countershaft is in driving engagement with the other headset gear.

A selectively engageable ratio change clutch, which may be a synchronizer clutch assembly, selectively connects one gear element of the even countershaft to the odd countershaft and selectively and alternately connects the odd countershaft to a gear element journalled on the odd countershaft. Other types of ratio change clutches also could be used, rather than a synchronizer clutch assembly.

According to another aspect of the invention, the ratio change clutches mounted on the countershaft axis and the ratio change clutches mounted on a mainshaft axis will establish an added low ratio and an added overdrive ratio in addition to a low-speed ratio and a high-speed ratio typically available in a gearing arrangement having the same number of gear pair engagements. This is accomplished without the necessity for using an additional gearing arrangement, such as range gearing, and without adding an additional pair of headset gears.

The dual clutches can be engaged and disengaged, as previously described, to effect power shifts between a given ratio and an adjacent ratio during a shift sequence in a single expanded ratio spread following initial launch of the vehicle. A ratio change from an overdrive ratio to an adjacent high ratio may be achieved by interrupting torque delivery from the engine to vehicle traction wheels as ratio change clutches are engaged and disengaged. Each of the other ratio changes, including ratio shifts to and from a direct ratio and an additional overdrive in the expanded ratio spread, may be achieved without interrupting torque delivery.

PARTICULAR DESCRIPTION OF AN EMBODIMENT OF THE INVENTION

Figures 1, 1A:
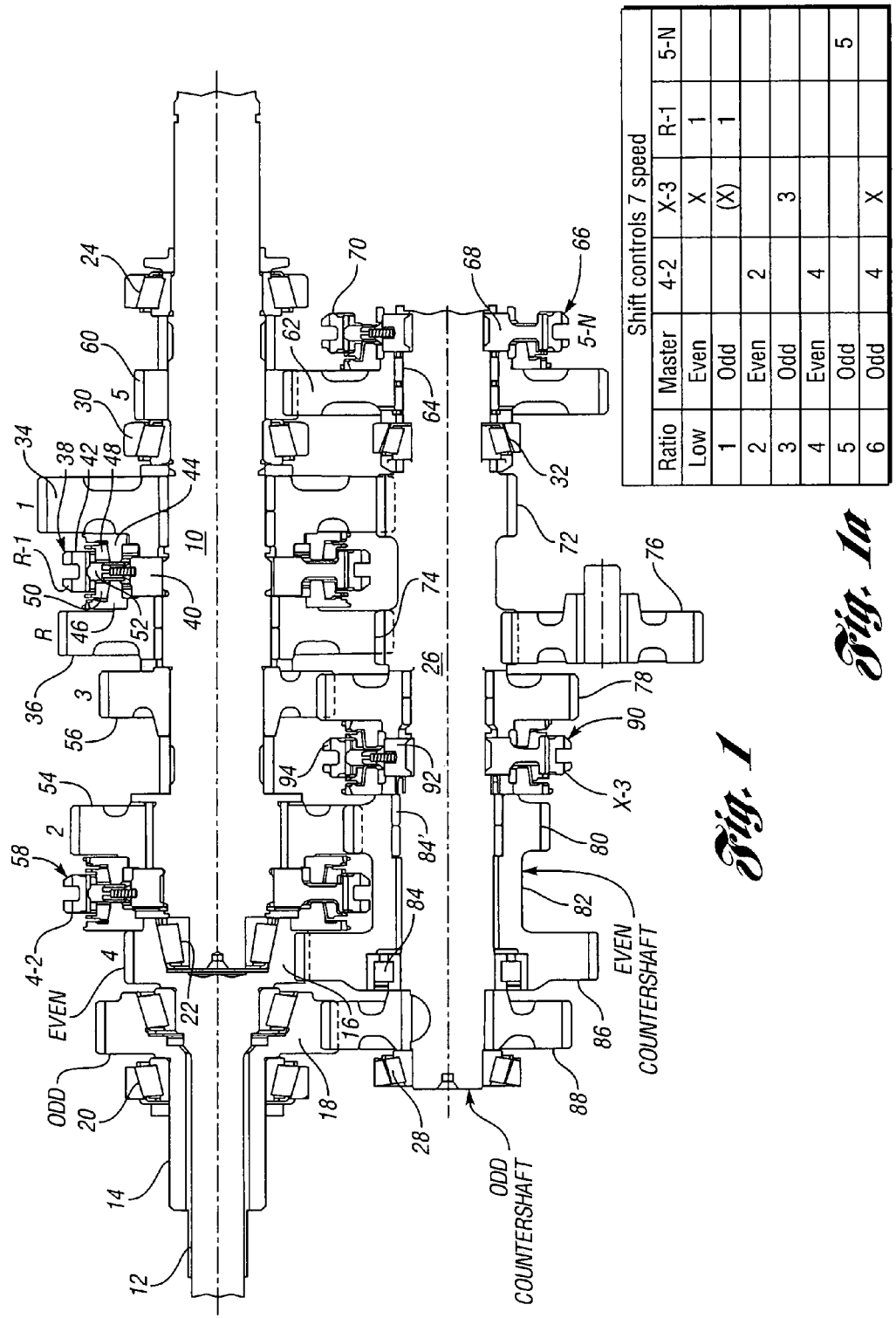
FIG. 1 is a cross-sectional view of one embodiment of the invention, including a single set of headset gears and a synchronizer ratio change clutch on a countershaft axis for effecting an extra low ratio and an extra overdrive ratio.
FIG. 1a is a chart that illustrates the engagement and release pattern for ratio changing clutches for the transmission of FIG. 1 during a single, extended ratio range.

The transmission shown in FIG. 1 is a countershaft-type transmission having a mainshaft 10, which is integral with, or connected to, a power output shaft. A pair of power input shafts, as shown at 12 and 14, is drivably connected to an engine (not shown) through a master dual clutch assembly, as previously described. Power input shaft 14 is a sleeve shaft that surrounds power input shaft 12. Shafts 12 and 14 are respectively connected drivably to a so-called "even" headset gear 16 and to a so-called "odd" headset gear 18. Gear 18 is journalled on a transmission housing (not shown) by a tapered roller bearing 20. Mainshaft 10 is journalled at its left end, as shown in FIG. 1, by tapered roller bearing 22 within a bearing cavity in even headset gear 16, as shown. The opposite end of mainshaft 10, which is the right end as illustrated in FIG. 1, is journalled in the transmission housing by bearing 24.

For convenience, the gears on the axis of mainshaft 10 involved during operation in ratios 1 through 5 are identified, respectively, by numerals 1-5.

A countershaft, which is identified as an odd countershaft, is shown in FIG. 1 at 26. It is journalled on the transmission housing at its left end by tapered roller bearing 28. It is journalled at its opposite end, the right end, by a similar bearing (not shown). Auxiliary bearings 30 and 32 may be used for supporting the shafts 10 and 26, respectively.

A first ratio gear 34 is journalled on mainshaft 10. A reverse drive gear 36 also is journalled on mainshaft 10 adjacent gear 34. A synchronizer ratio change clutch 38 is situated between gears 34 and 36. It includes a hub 40 with external splines that engage internal splines formed on synchronizer clutch sleeve 42. Synchronizer clutch elements 44 and 46 are secured to gears 34 and 36, respectively.

A first synchronizer ring 48 with an internal cone clutch surface is disposed between synchronizer clutch element 44 and hub 40. Likewise, a synchronizer ring 50, which has an internal cone clutch surface, is situated between gear 36 and hub 40.

Internal spline teeth on sleeve 42, when sleeve 42 is shifted in a right-hand direction, engage external teeth on synchronizer ring 48, thereby applying a synchronizer clutch engaging force on clutch element 44 to establish synchronism in the rotary motion of shaft 10 and gear 34. When synchronism is established, sleeve 42 is shifted farther in a right-hand direction to engage external teeth formed on clutch element 44, thereby locking gear 34 to shaft 10. Spring-loaded detent 52 is engaged in a detent groove when the sleeve 42 is in a neutral position. When sleeve 42 is shifted to the right, a clutch engaging force is created on synchronizer ring 48. A shifting force applied to sleeve 42 in a right-hand direction will establish synchronism in the motion of gear 44 and clutch 40.

When sleeve 42 is shifted in a left-hand direction to establish a reverse power flow path through gear 36, a detent force is applied to a synchronizer ring 50 similarly will establish synchronism between hub 40 and gear 36.

A second ratio gear 54 is journalled on mainshaft 10. A third ratio gear 56 is secured, by splines or by another gear mounting technique, to mainshaft 10.

A synchronizer ratio change clutch 58 is disposed between gear 54 and headset gear 16. Ratio change clutch 58 is similar in construction to the previously described. ratio change clutch 38. It includes a hub that is splined or otherwise secured to mainshaft 10 and a sleeve that is shiftable toward the gear 54 or toward the headset gear 16 to selectively establish a driving connection between mainshaft 10 and gear 54 and between mainshaft 10 and headset gear 16.

A fifth ratio gear 60 is secured by splines or by another assembly technique to mainshaft 10. Gear 60 is in continuous driving engagement with countershaft gear element 62 journalled on odd countershaft 26 by bearing 64. It may be situated adjacent bearing 32. Gear 62 can be selectively connected to odd countershaft 26 by synchronizer clutch ratio change 66, which may be similar in construction to the previously described synchronizer ratio change clutch 38. Ratio change clutch 66 has a hub 68 that is connected directly to countershaft 26 and that is drivably connected to gear 62 when sleeve 70 is shifted to the left.

First ratio gear 34 engages continuously gear element 72, which is formed on or which is otherwise directly connected to countershaft 26.

Reverse gear 36 drivably engages reverse gear element 74, which is formed on or otherwise directly connected to countershaft 26. Gear element 74 is in continuous engagement with a reverse drive pinion 76 mounted rotatably on an axis that is displaced from the axis of mainshaft 10 and the axis of countershaft 26. Reverse drive pinion 76 also engages reverse gear 36. Reverse drive pinion 76 is illustrated in FIG. 1 out of position for clarity purposes.

Third ratio gear 56 engages drivably gear element 78, which is journalled on odd countershaft 26. A second ratio countershaft gear element 80 is formed on or otherwise directly connected to even countershaft sleeve 82, which is journalled on countershaft 26 by bearings 84 and 84'. Even countershaft 82 is directly connected, as shown, to fourth ratio gear element 86 as well as second ratio gear element 80. Gear element 86 drivably engages fourth ratio headset gear 16.

Countershaft gear element 88 is splined or keyed or otherwise directly connected to countershaft 26. It directly engages headset gear 18.

A synchronizer ratio change clutch 90 is mounted on countershaft 26 between countershaft gear elements 80 and 78. The construction of countershaft ratio change clutch 90 may be similar to the construction of countershaft ratio change clutch 38, previously described. It includes a clutch hub 92, splined or otherwise secured to countershaft 26, and a synchronizer clutch sleeve 94, which is shiftable to the left or to the right to selectively engage countershaft gear elements 80 and 78, respectively.

The engagement-and-release pattern for the clutches during a ratio change sequence is set forth in FIG. 1a. The dual clutch assembly usually is identified as a master clutch. The ratio change clutch 58 is identified as a "4-2" clutch. Ratio change clutch assembly 90 is identified as an "X-3" clutch. The ratio change clutch 38 is identified as a "R-1" clutch. Ratio change clutch 66 is identified as a "5-N" clutch.

The master clutch assembly selectively connects the engine with input shafts 12 and 14, as previously described. The terms "even" and "odd" are used to describe the shafts 12 and 14, respectively, since they are in a torque flow path for odd ratios and even ratios.

During operation in the low ratio, which is an additional ratio made available by the ratio change clutch 90, torque is delivered from the engine to input shaft 12. The ratio change clutch 90 is shifted to the left, which locks the countershaft 26 to the countershaft 82. A power flow path then includes shaft 12, gear element 88, countershaft 26, gear element 80, gear 54 and mainshaft 10.

By disengaging the master clutch assembly friction disc for shaft 12 and engaging the master clutch assembly friction disc for input shaft 14, a power shift from the low ratio to the first ratio is achieved. A torque flow path then is established through shaft 14, headset gear 18, countershaft gear element 88, countershaft 26, countershaft gear element 72, mainshaft gear 34 and mainshaft 10. Mainshaft 10 is connected to gear 34 through synchronizer clutch assembly 38, which was preselected into engagement with the clutch teeth on gear 34 during operation in the low ratio. This feature makes possible a power shift from the low ratio to the first ratio. Although clutch 90 can remain shifted in a left hand direction, it does not deliver driving power to mainshaft 10 since ratio change clutch 58 is disengaged (i.e., in neutral) at this time.

A shift from the first ratio to the second ratio also is a power shift as the engine becomes connected to input shaft 12 through the master clutch assembly by "swapping" or "trading" master clutch assembly friction discs. Synchronizer ratio change clutch 90, which was preselected during first ratio operation when it was not delivering torque, assumes a neutral position at this time. The torque flow path then consists of input shaft 12, the even headset gear 16, the sleeve countershaft 82, mainshaft gear 54 and ratio change clutch 58, which is shifted to the right. The ratio change clutch 58 is pre-engaged under zero torque conditions to condition it for second ratio operation.

A ratio change from the second ratio to the third ratio by trading clutch friction discs in the master clutch assembly causes torque to be delivered through input shaft 14 as torque flow through the input shaft 12 is interrupted. At this time, headset gear 18 drives gear element 88. The torque flow path then includes ratio change clutch 90, which is connected to gear element 78 at this time. Clutch sleeve 94 is shifted to the right during second ratio operation to pre-select third ratio. Clutch sleeve 94 is not under torque at this time since the corresponding friction clutch disc for the master clutch assembly is not engaged during second ratio operation.

A shift from the third ratio the fourth ratio is achieved by disengaging ratio change clutch 90 by moving the sleeve 94 to the neutral position and by engaging the ratio change clutch 58 by moving the clutch sleeve for ratio change clutch 58 to the left during third ratio operation. This directly connects fourth ratio headset gear 16 to the mainshaft 10. The driving connection between mainshaft 10 and gear 16 was effected under zero torque conditions by pre-selecting the ratio change clutch 58 and "trading" master clutch assembly friction discs.

A ratio change to the fifth ratio is achieved by shifting clutch sleeve 70 for the ratio change clutch 66 to the left. This establishes a direct connection between countershaft 26 and overdrive gear 62, which meshes, as explained previously, with mainshaft gear 60. Ratio change clutch 66 was pre-engaged during operation in the fourth ratio when the clutch sleeve for the ratio change clutch 58 was shifted to the left.

A ratio change to the second overdrive ratio, which is the sixth ratio, is obtained by moving the sleeve for fifth ratio change clutch 66 to the right (neutral position) and then moving the sleeve for ratio change clutch 90 to the left to engage gear element 80. Prior to this, the fourth ratio clutch sleeve for clutch 58 is engaged during operation in the fifth ratio. This shift from the fifth ratio to the sixth ratio, unlike the shifts between the other ratios, requires torque interruption so that the clutch sleeves for the ratio change clutch 90 and the clutch sleeve for the ratio change clutch 58 can be shifted to the left under zero torque conditions. Torque interruption can be achieved using known techniques, such as engine throttle control or engine fueling control, or ignition spark timing control, depending on the type of engine being used. Ratio upshifts from the fourth ratio to the sixth ratio and ratio downshifts from the sixth ratio to the fourth ratio can be powershifts by "trading" clutch discs in the master clutch assembly. The power downshift from the sixth ratio to the fourth ratio is particularly advantageous during "kick-down" conditions.

An embodiment of the invention has been disclosed, but it will be apparent to persons skilled in the art that modifications may be made without departing from the scope of the invention. All such modifications and equivalents thereof are intended to be covered by the following claims.

What is claimed is:

1. A multiple ratio power transmission for an automotive vehicle powertrain comprising a pair of power input shafts and a power output mainshaft;

a pair of headset gears, a first of the headset gears being connected to a first of the input shafts and a second of the headset gears being connected to a second of the input shafts;

first and second countershafts on a common countershaft axis, gear elements disposed on the countershaft axis;

the first headset gear drivably engaging a first of the countershaft gear elements and the second headset gear drivably engaging a second of the countershaft gear elements;

mainshaft gears disposed on a mainshaft axis;

the first countershaft gear element being connected to the first countershaft and the second countershaft gear element being connected to the second countershaft; and mainshaft ratio change clutches on the mainshaft axis for selectively establishing driving connections between the mainshaft gears and the mainshaft;

a countershaft ratio change clutch on the countershaft axis selectively connecting the first and second countershafts, and at least one mainshaft ratio change clutch selectively connecting one of the mainshaft gears to the mainshaft, the one mainshaft gear engaging a third of the countershaft gear elements whereby a low powertrain ratio is established as a first powertrain ratio is pre-selected.

2. A multiple ratio transmission mechanism for an automotive vehicle powertrain comprising first and second power input shafts, a first headset gear connected to the first power input shaft and a second headset gear connected to the second power input shaft;

a mainshaft disposed on a common axis for the first and second power input shafts;

first and second countershafts, the second countershaft being a sleeve shaft disposed on an axis for the first countershaft;

the first headset gear drivably engaging a first countershaft gear element on the first countershaft and the second headset gear drivably engaging a second countershaft gear element on the second countershaft;

mainshaft gears including a first ratio mainshaft gear disposed on the common axis, the first ratio mainshaft gear being in driving engagement with a first ratio gear element on the first countershaft;

a first ratio change mainshaft clutch on the common axis for selectively connecting the first mainshaft gear to the mainshaft during first ratio operation; and a first ratio change countershaft clutch on the axis for the first countershaft for connecting the first and second counter shafts to establish a low ratio, a power shift being effected between the low ratio and the first ratio by alternately distributing power to first and second headset gears.

3. The multiple ratio transmission mechanism set forth in claim 2 wherein the mainshaft gears include a second ratio gear;

a second ratio change clutch on the common axis for selectively connecting the second ratio mainshaft gear to the mainshaft during operation of the transmission mechanism in the first ratio whereby second ratio is pre-selected;

a ratio shift from the first ratio to a second ratio being effected as power distribution from the second headset gear is established and power distribution from the first headset gear is disestablished.

4. The multiple ratio transmission mechanism set forth in claim 3 wherein the mainshaft gears include a third ratio gear and the countershaft gear elements include a third countershaft gear element journalled on the first countershaft and engaging the third ratio gear;

the third countershaft gear element being connected to the first countershaft by the first ratio change clutch on the axis for the first countershaft during operation in the third ratio;

a ratio shift from the second ratio to a third ratio being established as power distribution from the first headset gear is established and power distribution from the second headset gear is disestablished.

5. The multiple-ratio power transmission set forth in claim 4 wherein the mainshaft gears include a first high ratio gear and the countershaft gear elements include a fourth countershaft gear element journalled on the first countershaft;

the first high ratio gear drivably engaging the fourth countershaft gear element; and a second ratio change countershaft clutch for connecting the fourth countershaft gear element to the first countershaft to establish first high ratio operation, the first ratio change mainshaft clutch being released prior to establishment of first high ratio operation.

6. The multiple-ratio power transmission set forth in claim 5 wherein second high ratio operation is established as the second ratio change countershaft clutch is disengaged and the mainshaft is drivably connected to the second power input shaft and the second countershaft is drivably connected to the first countershaft.

7. The multiple-ratio power transmission set forth in claim 5 wherein first high ratio operation is a first overdrive ratio operation.

8. The multiple-ratio power transmission set forth in claim 6 wherein the second high ratio operation is a second overdrive ratio operation.

9. The multiple-ratio transmission set forth in claim 8 wherein second overdrive ratio operation is characterized by a higher speed ratio than the speed ratio during first overdrive ratio operation.

10. A multiple ratio power transmission for an automotive vehicle powertrain comprising a pair of power input shafts and a power output mainshaft;

a pair of headset gears, a first of the headset gears being connected to a first of the input shafts and a second of the headset gears being connected to a second of the input shafts;

first and second countershafts, one countershaft being being a sleeve shaft surrounding the other countershaft on a countershaft axis;

mainshaft gears disposed on a mainshaft axis;

countershaft gear elements on each countershaft;

one headset gear being engageable with a countershaft gear element on the first countershaft and a second headset gear being engageable with a countershaft gear element on the second countershaft;

ratio change clutches on the mainshaft axis and on the countershaft axis;

the ratio change clutches being selectively engaged and disengaged to establish multiple gear ratios in a range of ratios for the power transmission;

one ratio change clutch on the countershaft axis being engaged simultaneously with a ratio change clutch on the mainshaft axis to effect a low ratio and a high ratio that are out of the range of ratios whereby additional ratios for the powertrain are available without a requirement for additional gearing.

11. The multiple ratio power transmission for an automotive vehicle powertrain set forth in claim 10 wherein the range of ratios includes an overdrive ratio, the high ratio being a second overdrive ratio.

12. The multiple ratio power transmission for an automotive vehicle powertrain set forth in claim 10 wherein the additional ratios include a low ratio of higher torque multiplication than a torque multiplication for each of the other ratios in the range of ratios.

* * * * *